US010279562B2

(12) United States Patent
Lin et al.

(10) Patent No.: US 10,279,562 B2
(45) Date of Patent: May 7, 2019

(54) HIGH-BUOYANCY MATERIAL AND SYSTEM

(71) Applicants: Kechuang Lin, Xiamen (CN); Yi-Jui Huang, Xiamen (CN)

(72) Inventors: Kechuang Lin, Xiamen (CN); Yi-Jui Huang, Xiamen (CN)

(*) Notice: Subject to any disclaimer, the term of this patent is extended or adjusted under 35 U.S.C. 154(b) by 0 days.

(21) Appl. No.: 15/594,622

(22) Filed: May 14, 2017

(65) Prior Publication Data

US 2017/0246835 A1 Aug. 31, 2017

Related U.S. Application Data

(63) Continuation of application No. PCT/CN2015/073456, filed on Mar. 2, 2015.

(51) Int. Cl.
| | |
|---|---|
| *A41D 3/00* | (2006.01) |
| *B32B 5/18* | (2006.01) |
| *B63B 1/38* | (2006.01) |
| *B63B 5/00* | (2006.01) |
| *B63B 5/24* | (2006.01) |
| *B63G 8/00* | (2006.01) |
| *C02F 1/00* | (2006.01) |
| *A41D 31/32* | (2019.01) |
| *C02F 101/10* | (2006.01) |

(52) U.S. Cl.
CPC .............. *B32B 5/18* (2013.01); *A41D 3/00* (2013.01); *A41D 31/325* (2019.02); *B63B 1/38* (2013.01); *B63B 5/00* (2013.01); *B63B 5/24* (2013.01); *B63G 8/00* (2013.01); *C02F 1/001* (2013.01); *A41D 2400/26* (2013.01); *B32B 2266/045* (2013.01); *B32B 2307/73* (2013.01); *B32B 2437/00* (2013.01); *B32B 2597/00* (2013.01); *B32B 2605/12* (2013.01); *B32B 2605/16* (2013.01); *B63B 2231/02* (2013.01); *B63B 2231/40* (2013.01); *C02F 2101/10* (2013.01); *Y02T 70/122* (2013.01)

(58) Field of Classification Search
CPC combination set(s) only.
See application file for complete search history.

(56) References Cited

FOREIGN PATENT DOCUMENTS

KR 101421660 B1 * 7/2014

OTHER PUBLICATIONS

Translation of KR 101421660 B1, see above for date and inventor.*

* cited by examiner

*Primary Examiner* — Victor S Chang
(74) *Attorney, Agent, or Firm* — Syncoda LLC; Feng Ma

(57) ABSTRACT

An apparatus including a fine-array porous material with a specific surface area higher than 10/mm, the specific surface area depending on different pore sizes, wherein the porous material comprises a plurality of pores having a substantially uniform size with a variation of less than about 20%, wherein the size is larger than about 100 nm and smaller than about 10 cm. The high-buoyancy apparatus can be part of a water vehicle such as a boat or a submarine, and the fine-array porous material is configured to reduce friction and/or control buoyancy. A conduit is also provided employing a fine-array porous material to reduce friction and/or control buoyancy. A garment is provided taking advantage of water repellant and/or UV/IR reflection properties of the fine-array porous material.

20 Claims, 4 Drawing Sheets

HIGH-BUOYANCY MATERIAL AND SYSTEM

CROSS-REFERENCE TO RELATED APPLICATIONS

The present application is a continuation of, and claims priority to, PCT/CN2015/073456, filed on Mar. 2, 2015, the disclosure of which is hereby incorporated by reference in its entirety.

BACKGROUND

Buoyant materials can be used in boats, submarines, underwater pipelines, and other mechanical structures and vehicles for use with an aquatic environment. Structures that provide buoyancy can be designed with the inspiration of bionics. For example, a king lotus plant has a skeleton structure on its bottom surface composed of many thick veins. A diaphragm connects the veins, increasing the specific area and the volume of the air chamber formed therein. The resulting structure can float on water surface while supporting 30-80 kg of weight.

SUMMARY

The present disclosure relates to large-dimension (in some cases 3D) fine-array porous materials with high surface-area-to-volume ratios, and their applications as high-buoyancy and/or low-friction materials.

Typical foam materials may have pore sizes of 0.5~8 mm. It may be possible to manufacture porous blocks with a specific surface area of 14~3100/mm. However, the pore sizes have a large variation, for example >100%.

Some embodiments disclosed herein allow manufacturing high surface-area-to-volume ratio porous membranes with a surface area larger than 100 cm$^2$, such as 20 cm×20 cm. The sizes of the pores can be, for example, about 100 nm~10 cm.

Disclosed herein includes an apparatus comprising a fine-array porous material with a specific surface area higher than 10/mm, the specific surface area depending on different pore sizes, wherein the porous material comprises a plurality of pores having a substantially uniform size with a variation of less than about 20%, wherein the size is larger than about 100 nm and smaller than about 10 cm. The fine-array porous material can have a uniform air pressure therein. In addition, a uniform surface tension can form on the fine-array porous material surface. As a result of the similar opening sizes of the fine-array porous material, a substantially stable surface tension can be achieved as F=P/A, wherein F represents the surface tension, P represents the pressure, and A represents the surface area.

The apparatus can further include a support layer disposed over the porous material. The support layer can be a loading substrate or main body, such as similar to a hull of a boat. In some embodiments, the support structure can be a substrate for growing the fine-array porous material. It is not necessary to remove the growth substrate. In some embodiments, further or multiple support structures can be added. In some embodiments, the porous material can be fabricated substrateless, and then fixed to one or more support layers. The various layers can be affixed to each other using a binder, through bonding, or glued together.

In some implementations, the porous material can include a plurality of grain boundary regions filled with a solid material to increase a mechanical strength of the porous material, wherein the specific surface area is higher than 4100/mm, resulting in a higher air storage volume. The size variation is less than about 10%, and the grain boundary regions can have a size of about 5 μm-1 mm, or even larger in some embodiments. For example, for a large-area fine-array porous material with pore sizes of about 10 cm, a grain boundary region can have a area of about 1 m$^2$. In some other implementations, the fine-array porous structure has no grain boundaries.

In some embodiments, a vehicle is provided including a high-buoyancy structure including a fine-array porous material with a specific surface area higher than 10/mm, the specific surface area depending on different pore sizes, wherein the porous material comprises a plurality of pores having a substantially uniform size with a variation of less than about 20%, wherein the size is larger than about 100 nm and smaller than about 10 cm. In some implementations, the fine-array porous material can include one or more large-area fine-array porous films. For example, the film can be a piece of film, or bonded from a plurality of patches of films. In some other implementations, the fine-array porous material can be one or more blocks of bulk fine-array porous material.

In some embodiments, the porous material includes a plurality of grain boundary regions filled with a solid material to increase a mechanical strength of the porous material, wherein the specific surface area is higher than 10/mm, resulting in a higher air storage volume. The size variation is less than about 10%, and wherein the grain boundary regions have a typical size of about 5 μm-1 mm. In some implementations, the grain boundary regions can have a size about 1 m.

In some embodiments, the vehicle is a boat. A conventional vehicle in an aquatic environment has a surface in contact with water, thereby having a high friction when traveling on water, particularly at a higher speed. As a result of the significantly higher air storage volume of the fine-array porous material, the vehicle according to some embodiments disclosed herein would have mostly air pockets coming into contact with the water. Only a smaller portion of the contacting surface is that between the material and water. As such, due to both increased buoyancy and improved fluid dynamic characteristics at the boundary of air and water, the friction is substantially reduced.

In some embodiments, the vehicle is a submarine. The outer surface of the submarine can have about 74% covered by air in the fine-array porous material. Only about 26% of the surface area has the material ingredient in contact with the water, as a result of using the fine-array porous material to cover the submarine. In some embodiments, the fine array porous could be FCC or HCP atom array and about 74% of the surface area of the submarine is air. In some embodiments, the fine array porous could be BCC atom array and the ratio is about 68%. In some embodiments, the fine array porous could be SC atom array and the percentage is about 52%. Reminiscent to a magnetic levitation train, there is little contact between the material substance and the water. As such, the drag or friction with water is greatly reduced.

In some embodiments, the vehicle is a torpedo, and a fine-array porous film can cover the entire torpedo surface.

In some embodiments, the vehicle is an autonomous or unmanned under-water vehicle or surface vehicle.

In some embodiments, the porous material is configured to be in contact with a liquid while the vehicle is moving relative to the liquid.

In some embodiments, the porous material comprises at least one of polymer, ceramic, metal, or composite material.

In another aspect, a fluid pipe is provided including a porous material with a specific surface area higher than 10/mm, the specific surface area depending on different pore sizes, wherein the porous material comprises a plurality of pores having a substantially uniform size with a variation of less than about 20%, wherein the size is larger than about 100 nm and smaller than about 5 mm, wherein the porous material is configured to be in contact with fluid flowing through the fluid pipe to reduce friction between the fluid and the pipe. The fluid can be, for example, oil, a mixture of oil and water from shale oil production, or a fluidic chemical in a chemical plant.

In some embodiments, the fluid pipe is a surface fluid pipe. Only the inner surface of the pipe needs to have the fine-array porous film disposed thereon to reduce the friction between the inner surface and the fluid flowing through the pipe.

In some embodiments, the fluid pipe is an oil pipe. The oil pipe can be a surface oil pipe with only its inner surface coated with a fine-array porous material. In some other implementations, the oil pipe can be an underwater oil pipe, and can have its outer surface also coated with a fine-array porous material to adjust the buoyancy of the pipe.

In some embodiments, the fluid pipe is a water pipe, such as a desalination water pipe. In this case, the fine-array porous material is configured not only to reduce the friction between the salt water and the pipe, but also filter the salt water for desalination.

In some embodiments, the fluid pipe is an underwater fluid pipe, and wherein the porous material is further configured to control buoyancy of the fluid pipe, for example, to reduce the stress on supporting stands for the pipe, or even eliminating the need for some stands.

In some embodiments, a water skiing shoe is provided with a bottom surface having a fine-array porous film disposed thereon. With the reduced friction, the shoe would allow skiing on wet surfaces or even dry surfaces. In some other embodiments, a surfing board is provided having a fine-array porous film disposed thereon for improved surfing characteristics.

In some embodiments, a garment (such as rain coat) is provided having a fine-array porous film as a coating on the outer surface. Not only the coating can be hydrophobic but also the fine array porous structure can prevent water from penetrating the surface, while being communicative for air.

In some embodiments, the fine array porous is also configured to be reflective (or even total reflective) of light of specific wavelengths. This can be achieved by selecting a material and pore sizes of the fine-array porous film, which has a photonic crystal structure. For example, a fine-array porous material can be composed of silicone (n=1.57), and the porous sizes can be selected to be reflective of infrared light. Such a fine-array porous material disposed at an inner surface of a shirt or a jacket can effectively keep the user warm by reflecting back the infrared radiation from the user body.

A corrected Bragg's equation can be employed to aid the design of the coating. For example, for light illuminating the coating vertically (90°) to the silicone fine-array porous film, the Bragg's equation can be simplified as: $\lambda_c = 2n_{eff} \times d$; wherein $\lambda_c$ is the wavelength of light being reflected, $n_{eff}$ is the effective refractive index, d is the distance between neighboring pores of the fine array. The effective refractive index can be calculated from: $n_{eff} = [n_{air}^2 \times f + n_{silicone}^2 \times (1-f)]^{1/2}$; wherein $n_{air}$ and $n_{silicone}$ are the refractive indices of air and silicone, respectively; f is the volume factor of the air bubble in the fine-array porous material; $d = (2/3)^{1/2} D$ wherein D is the diameter of the air bubble. Using $n_{silicone} = 1.59$ and $n_{air} = 1$, f=0.74, and for an infrared wavelength $\lambda_c = 1000$ nm, it can be calculated that D=520 nm. For an infrared wavelength $\lambda_c = 5000$ nm, the corresponding optimal D=2605 nm. Similarly, for a $\lambda_c = 10000$ nm, D=5200 nm.

In some embodiments, the fine-array porous film disposed on an outer surface of a jacket can be configured to be reflective (or even total reflective) of UV light, thereby providing UV protection to the user.

Compared with existing porous materials such as metal foams and nanoporous materials, the embodiments disclosed herein can have one or more of the following advantages: 1) large-dimension highly-porous materials with large relative surface areas can be achieved, with periodic structures having properties of photonic crystals such as total reflection for light with specified wavelengths. The materials (e.g., porous films) can have atomic-array-like structures, with a well-ordered closely-packed pores. This is in contrast to a material with randomly distributed pores, which would have a air chamber volumetric fraction could be much less or high than 74%, un-uniform surface tension characteristics for a unit area, and generally cannot cause laminar flows (uniform pressure) when having a relative motion with a fluid.

In some examples, nanoporous materials having a fine-array porous structure can be achieved.

Such highly porous materials/films can have a pore size of about 100 nm-10 cm, and a grain domain of about 5 μm-1 mm (such as 1 mm$^2$) or larger. The grain domains can be observed under OM as areas forming periodic or quasi-periodic structures. Defects similar to grain boundaries can exist between the grain domains. The grain boundaries between the grain domains can provide a major source of mechanical strength of the porous films.

A large-area macroporous thin film can be provided with a dimension of >20 cm×20 cm, with a thickness of about 10 cm (depending on colloidal particle sizes), for example. A very high surface-area-to-volume ratio can be achieved, described as $$s_v \approx \frac{281.8}{d}[(1-\theta)^{1/2} - (1-\theta)] \cdot (1-\theta)^{0.4}, \quad (1)$$

where $S_v$ is the specific surface area, d is the average pore diameter in units of mm, θ is the porous ratio. For example: for a d=0.01 mm, a porous ratio 74%, the specific surface area can be about 4100/mm; for d=0.001 mm, the specific surface area can be about 41000/mm.

In some embodiments, a large bulk porous material with a three-dimensional (3D) structure can be manufactured. These are in contrast with the porous materials manufactured by existing approaches. Current metal foams typically have a pore size of >500 μm, and a specific surface-area of about 14~3100/mm, with large pore size variations (such as >100%).

The specific areas of the porous materials (e.g., fine-array porous films) disclosed herein can be >10/mm in some embodiments, >3100/mm in some embodiments, or >4100/mm in some embodiments (such as about 4108/mm, about 8217/mm, or about 41087/mm). Meanwhile, the pores in these materials have substantially uniform sizes, such as <20% of variation in terms of standard deviation, or <10% of variation according to some embodiments.

DETAILED DESCRIPTION

Porous materials such as metal foams can have high surface-area-to-volume ratios, for example described as $$s_v \approx \frac{281.8}{d}\left[(1-\theta)^{1/2} - (1-\theta)\right] \cdot (1-\theta)^{0.4},$$

where $S_v$ is the specific surface area, d is the average pore diameter in units of mm, θ is the porous ratio. For example: for a d=0.01 mm, a porous ratio of 90%, the specific surface area is 2425/mm. Porous materials can exhibit mechanical, acoustical, thermal, optical, electrical and chemical properties suitable for a variety of applications.

A typical metal foam can have an interconnected matrix of metallic ligaments with varying lengths and orientations, and individual void spaces (pores) of different shapes and sizes formed between adjacent ligaments. Typical metal foams may have pore sizes of 0.5-8 mm.

In addition to the specific area, uniformity of the pore sizes is another important factor. In conventional metal foams, the pore sizes have variations higher that 100%.

A high-buoyancy material according to some embodiments disclosed herein have specific volume in the range of 10%-76%. In some embodiments, the specific volume is in the range of 50-74%, such as 74%.

Figure 1:
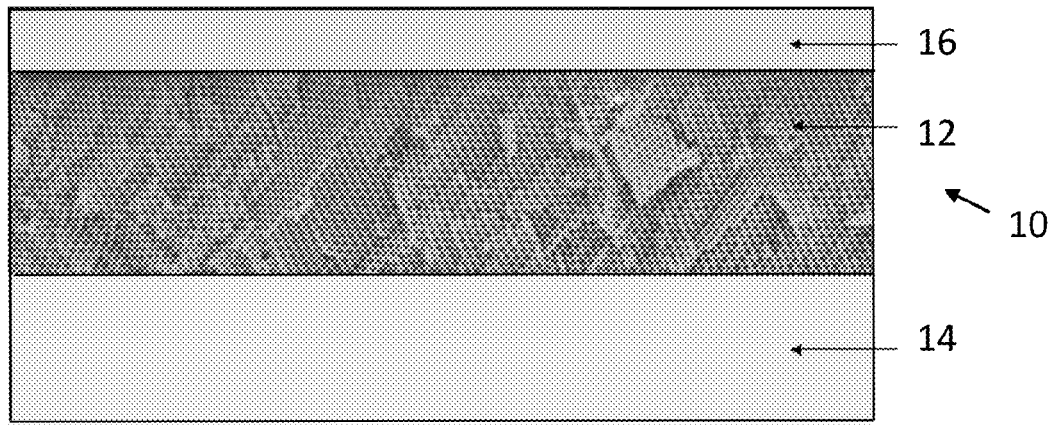
FIG. 1 illustrates a high-buoyancy structure according to some embodiments.
Figure 2:
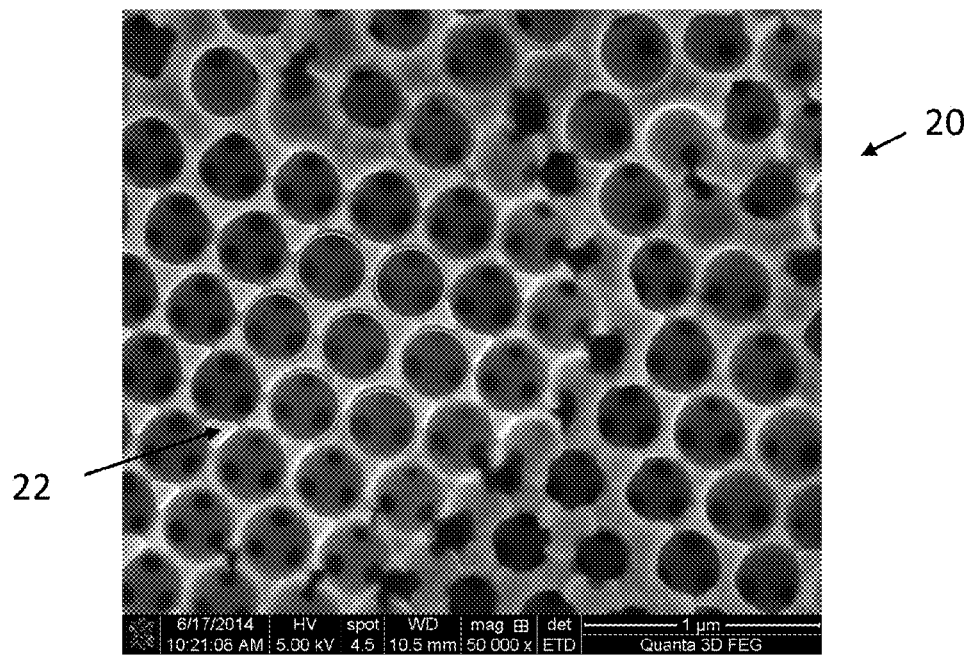
FIG. 2 is a magnified view of the high-buoyancy structure.

FIG. 2 is a magnified view of the fine-array porous film 12 of FIG. 1. The surface of the film can be further coated, or structured such that it is hydrophobic. The pores can have a periodic distribution. Generally the higher the specific volume of the pores, the better is the buoyancy characteristics or hydrophobic properties.

In some embodiments, an electric current is provided to flow through the fine-array porous material, further improving the buoyancy characteristics or hydrophobic properties.

As illustrated in FIG. 2, the fine-array porous material 20 can have nanostructures 22 formed with multiple pores. Such 3D nanostructures can also be periodic, on top of the periodicity of the individual pores. Compared with 2D periodic structures, even if water percolates into the porous material 22 under pressure, deeper layers (such as a second layer) can still prevent the water from getting in, thereby maintaining the hydrophobic properties. In contrast, the hydrophobic property of a 2D periodic structure would have failed.

In addition, with the increase of the water pressure toward the 3D periodic structure, the air inside the structure is compressed, increasing the air pressure, further repelling the water.

Advantageously, the porous materials according to some embodiments disclosed herein can significantly increase the volume of the air chambers, thereby improving buoyancy.

In contrast to conventional metal foams that have relatively low specific surface areas and lack of uniformity in pore sizes, the fine-array porous material has larger specific areas, and the pores therein are also highly uniform.

Table 1 below compares parameters, as defined in association with Equation (1) above, of conventional metal forms with those of the fine-array porous materials disclosed herein. As shown, the specific surface areas of the fine-array porous materials can be higher than 3130/mm, such as higher than 4100/mm. However, specific surface areas of the fine-array porous materials can also be in the range of 10/mm and 3130/mm, and would still have superb properties for various applications resulting from other properties unmatched by metal forms. For example, fine-array porous materials according to some embodiments, with a specific surface area >10/mm, can have very uniform pore sizes, such as <20% as measured by the standard deviation, or <10% as measured by the standard deviation.

TABLE 1

| | d (mm) | 281.8/d | θ | $(1-\theta)^{0.5}$ | 1-θ | $(1-\theta)^{0.4}$ | Sv (mm2/mm3) |
|---|---|---|---|---|---|---|---|
| Metal Foams | 1 | 281.8 | 0.95 | 0.224 | 0.05 | 0.302 | 14.760 |
| | 0.5 | 563.6 | 0.95 | 0.224 | 0.05 | 0.302 | 29.521 |
| | 0.5 | 563.6 | 0.90 | 0.316 | 0.10 | 0.398 | 48.516 |
| | 0.5 | 563.6 | 0.85 | 0.387 | 0.15 | 0.468 | 62.618 |
| | 0.01 | 28180 | 0.95 | 0.224 | 0.05 | 0.302 | 1476.032 |
| | 0.01 | 28180 | 0.90 | 0.316 | 0.10 | 0.398 | 2425.786 |
| | 0.01 | 28180 | 0.85 | 0.387 | 0.15 | 0.468 | 3130.922 |
| Fine-array porous material | 0.01 | 28180 | 0.74 | 0.510 | 0.26 | 0.583 | 4108.658 |
| | 0.005 | 56360 | 0.74 | 0.510 | 0.26 | 0.583 | 8217.316 |
| | 0.001 | 281800 | 0.74 | 0.510 | 0.26 | 0.583 | 41086.578 |

For example, the high-buoyancy structure 10 illustrated in FIG. 1 comprises a fine-array porous film 12 that is configured to come in contact with fluid (or gas) 14 to improve buoyancy, and a support layer 16 disposed thereon to support weight (such as cargo in a ship). The parameters of the fine-porous film 12 can be adjusted during the manufacturing process to provide different specific volumes and therefore buoyancies.

In some embodiments, fine-array porous ZnO films are provided. For example, a process can include: 1) preparation of monodispersed polystyrene (PS) colloidal suspension; 2) assembly of PS colloidal crystal template and drying of the template at about 90-100° C. in the ambient atmosphere, for example for about 30 minutes; 3) electrodeposition of ZnO in the $Zn(NO_3)_2$ electroplating solution with a constant electrical current (e.g. 1 mA/cm²) at about 70° C.; and 4) removal of PS nanosphere templates by heating in the ambient at about 500° C. for <2 hours. A fine-array porous ZnO film with controllable periodic layers can thus be fabricated.

In some embodiments, the colloidal particle template formed by the assembly process can be made of polystyrene (PS), $SiO_2$, PMMA (Poly(methyl methacrylate)), or any powder substance with a sphere shape, with a particle size in the range of about 100 nm-10 cm and diameter variation (e.g., standard deviation) within about ±20%, optimally within about ±10%. For example, in an embodiment, the particle size is about 200 nm±40 nm; in another example, the particle size is about 300 nm±60 nm. The particles can have spherical shapes, and can be hollow or solid spheres. In some other embodiments, non-spherical shapes can be employed.

In some embodiments, the grain domain of the fine-array porous films (planar/monolithic) can be in a range of about 5 μm-1 m, and the pore size can be in the range of about 100 nm-10 cm.

The porous materials disclosed herein can be used in many areas of applications. In some other embodiments, the porous materials can be used in application areas such as increasing buoyancy, reducing drag, or reducing weight while improving strength of a mechanical structure.

Figure 3:
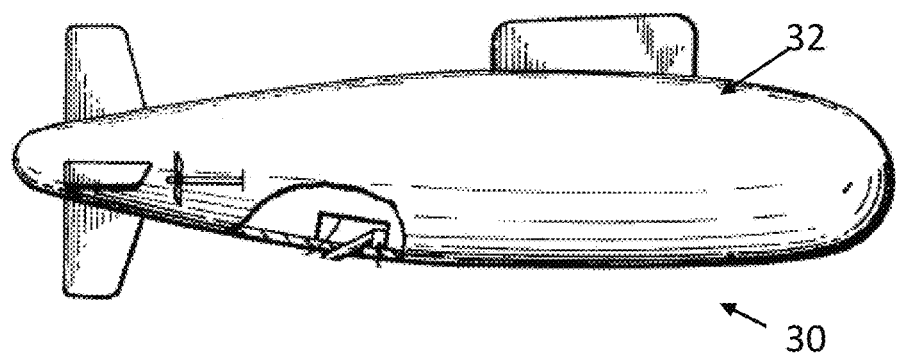
FIG. 3 is a diagram illustrating the porous material for use on a submarine.

For example, as illustrated in FIG. 3, a vehicle (such as an underwater vehicle 30) can be provided employing the porous material on a hull surface 32 or in the hull structure. The porous material can provide improved buoyancy to the vehicle, and can also reduce the drag to the vehicle while moving in a fluid (such as water). In the case of the underwater vehicle 30, the porous material can be distributed all over the hull surface 32. The underwater can be a submarine, a torpedo, etc., and can be manned or unmanned.

Figure 4:
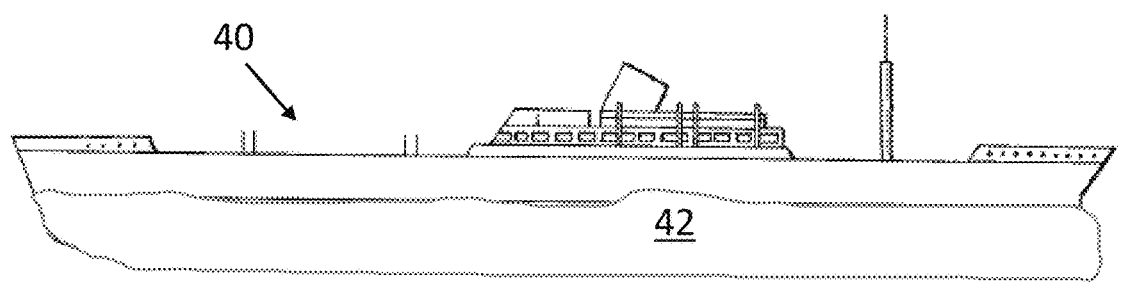
FIG. 4 is a diagram illustrating the porous material for use on a ship.

In some other embodiments, as illustrated in FIG. 4, a surface vehicle (such as a boat 40) can be provided employing the porous material on a surface area 42 that may come into contact with water. The porous material can provide improved buoyancy to the vehicle 40, and can also reduce the drag to the vehicle 40 while moving in a fluid (such as water).

Figure 5:
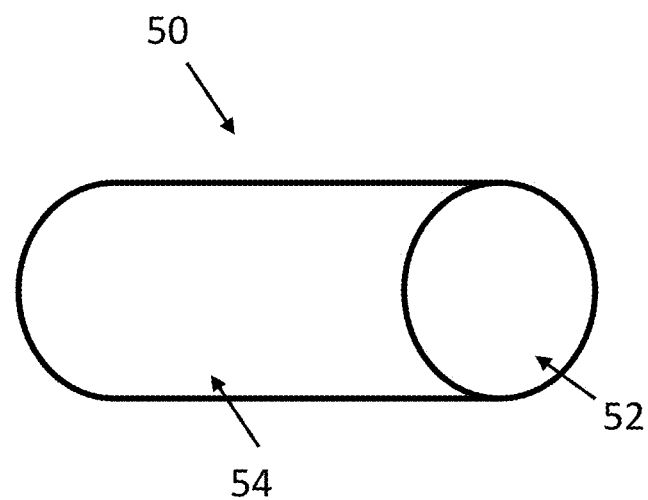
FIG. 5 is a diagram illustrating the porous material for use as an inner layer and/or outer layer of a conduit.

In some embodiments, as illustrated in FIG. 5, a conduit 50 can be provided employing the fine-array porous material on an inner surface 52. The conduit 50 can be, for example, an oil pipe, a water pipe, etc. The porous material can reduce the friction between the conduit 50 and a fluid (such as oil, water, etc) flowing therethrough.

In addition, in the case of the conduit 50 being a water pipe, the fine-array porous material disposed over the inner surface 52 can also act as a filter for purification and/or desalination of the water flowing through the conduit 50. The high surface-area-to-volume ratio of the porous material allows contaminated water to be purified, or salt water to be desalinated, effectively.

In some embodiments, the conduit 50 can have its outer surface 54 covered with a fine-array porous material. The fine-array porous material can increase the buoyancy of the conduit 50 when used as an underwater pipe, thereby reducing the need for supporting stands (for example, to anchor the undersea oil pipe 50 on the seabed).

Figure 6:
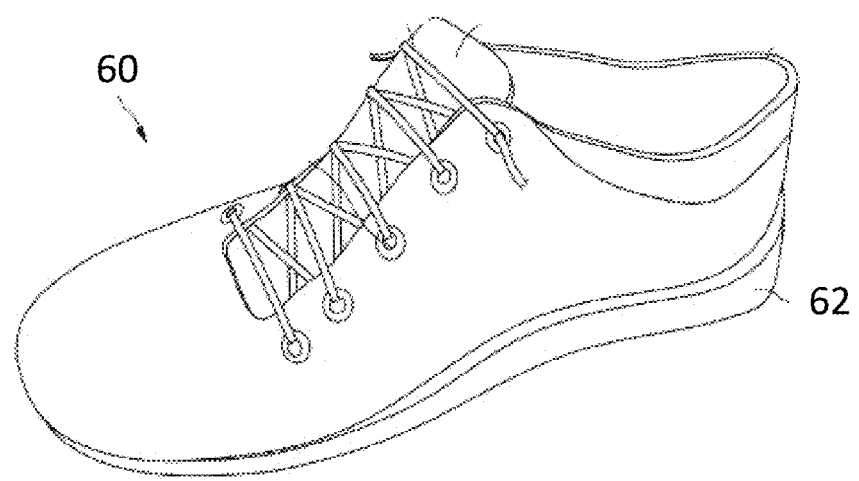
FIG. 6 is a diagram illustrating the porous material for use as a bottom coating of a shoe.

In some embodiments, as illustrated in FIG. 6, a shoe 60 is provided having a bottom portion 62 covered with a fine-array porous material. The fine-array porous material can reduce a friction between the shoe 60 and a wet surface. As such, the shoe 60 can be used as a skating shoe on a wet surface. In some other embodiments, the fine-array porous material can be applied to the blades of ice skates to reduce the friction between the blades and ice.

Figure 7:
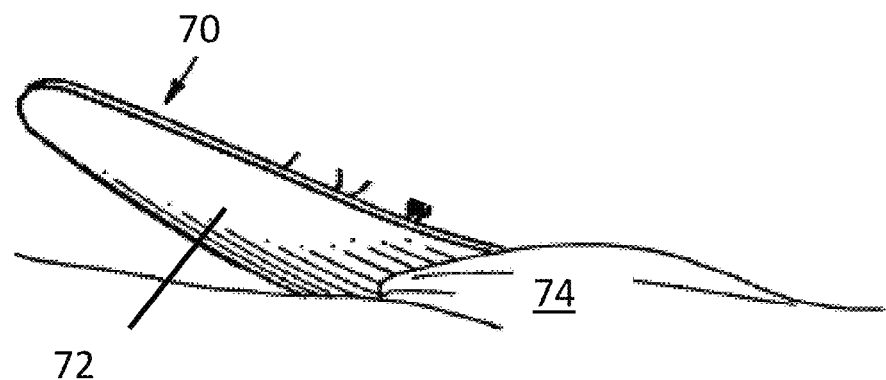
FIG. 7 is a diagram illustrating the porous material for use on a surf board.

In some embodiments, as illustrated in FIG. 7, a surf board 70 is provided having a bottom surface 72 coated with a fine-array porous material. The fine-array porous material can reduce a friction between the surf board 70 and the water 74, while increasing buoyancy of the surf board.

Figure 8:
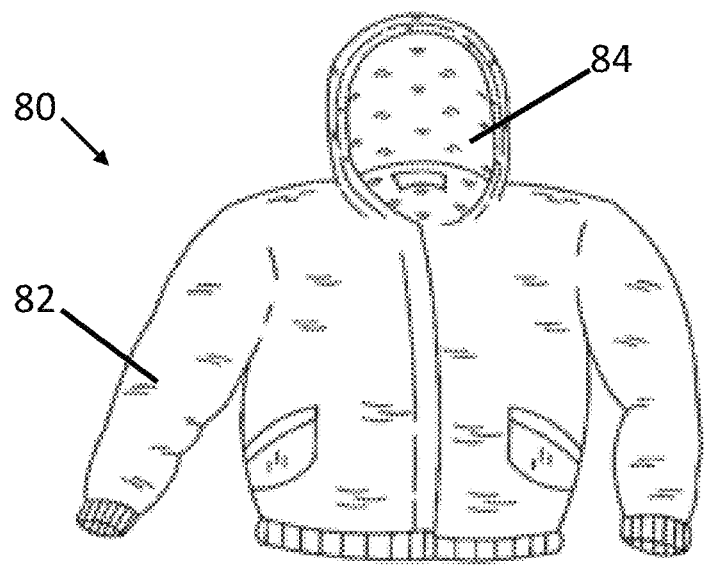
FIG. 8 is a diagram illustrating the porous material for use as an inner layer and/or outer layer of a jacket.

In some embodiments, as illustrated in FIG. 8, a garment such as a jacket 80 is provided having an outer surface 82 coated with a fine-array porous material. The fine-array porous material can be hydrophobic to thereby repel water, and the garment 80 can be used as a rain jacket. In addition, according to some implementations, the fine-array porous material on the outer surface 82 can have selected pore sizes and material such that photonic crystal effect of the fine-array porous material allows the outer surface 82 to be reflective (e.g., total reflective) of light of specified wavelengths, such as UV light. As such the garment 80 can protect the user from UV light.

In some implementations, a fine-array porous film disposed over the garment 80, such as at the inner surface 84, is designed to have optical properties of a photonic crystal that is total reflective of infrared light, thereby keeping the body temperature of the user, In some other embodiments, the fine-array porous material can be used as an air, oxygen, or hydrogen storage.

Although specific embodiments have been described above in detail, the description is merely for purposes of illustration. It should be appreciated, therefore, that many aspects described above are not intended as required or essential elements unless explicitly stated otherwise. Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A high-buoyancy apparatus comprising a fine-array porous ZnO material with a specific surface area higher than 10/mm, the specific surface area depending on different pore sizes, wherein the porous material comprises a plurality of pores having a substantially uniform size with a variation of less than about 20%, wherein the size is larger than about 100 nm and smaller than about 10 cm.

2. The apparatus of claim 1, further comprising a support layer disposed over the fine-array porous material, wherein the specific surface area $$s_v \approx \frac{281.8}{d}[(1-\theta)^{1/2} - (1-\theta)] \cdot (1-\theta)^{0.4}],$$

d is an average pore diameter in units of mm, θ is a porous ratio of 50-74%.

3. The apparatus of claim 2, wherein the support layer is configured to provide structural strength and protection to the fine-array porous material.

4. The apparatus of claim 2, wherein the support layer is a substrate of the fine-array porous material.

5. The apparatus of claim 1, wherein the porous material comprises a plurality of grain boundary regions filled with a solid material to increase a mechanical strength of the porous material, wherein the specific surface area is higher than 4100/mm, wherein the size variation is less than about 10%, and wherein the grain boundary regions have a size of about 5 µm-1 m.

6. The apparatus of claim 1, wherein the apparatus is configured as a water-repelling garment.

7. The apparatus of claim 6, wherein the fine-array porous material is further configured to be selectively reflective of light of specified wavelengths based on a photonic crystal property of the fine-array porous material.

8. A vehicle comprising a high-buoyancy structure including a fine-array porous material with a specific surface area higher than 10/mm, the specific surface area depending on different pore sizes, wherein the porous material comprises a plurality of pores having a substantially uniform size with a variation of less than about 20%, wherein the size is larger than about 100 nm and smaller than about 10 cm.

9. The vehicle of claim 8, further comprising a support layer disposed over the fine-array porous material.

10. The vehicle of claim 8, wherein the porous material comprises a plurality of grain boundary regions filled with a solid material to increase a mechanical strength of the porous material, wherein the specific surface area is higher than 4100/mm, wherein the size variation is less than about 10%, and wherein the grain boundary regions have a size of about 5 µm-1 m.

11. The vehicle of claim 8, wherein the vehicle is a boat.

12. The vehicle of claim 8, wherein the vehicle is an underwater vehicle.

13. The vehicle of claim 8, wherein the fine-array porous material is configured to be in contact with a fluid while the vehicle is moving relative to the fluid.

14. The vehicle of claim 8, wherein the fine-array porous material is composed of one of polymer, ceramic, metal, or composite material.

15. A conduit comprising a fine-array porous material with a specific surface area higher than 10/mm, the specific surface area depending on different pore sizes, wherein the porous material comprises a plurality of pores having a substantially uniform size with a variation of less than about 20%, wherein the size is larger than about 100 nm and smaller than about 10 cm, wherein the fine-array porous material is configured to be in contact with a fluid flowing through the conduit to reduce friction between the fluid and the conduit.

16. The conduit of claim 15, wherein the conduit is a surface fluid pipe.

17. The conduit of claim 15, wherein the conduit is an oil pipe.

18. The conduit of claim 15, wherein the conduit is a water pipe.

19. The conduit of claim 15, wherein the fine-array porous material is configured to filter or desalinate water flowing through the water pipe in addition to reducing the friction between the water and the water pipe.

20. The conduit of claim 15, wherein the conduit is an underwater fluid pipe, and wherein the fine-array porous material is further configured to control buoyancy of the fluid pipe.

* * * * *